United States Patent
Taylor et al.

(10) Patent No.: US 11,762,398 B1
(45) Date of Patent: Sep. 19, 2023

(54) MULTIMODAL BEACON BASED PRECISION LANDING SYSTEM FOR AUTONOMOUS AIRCRAFT

(71) Applicant: Near Earth Autonomy, Inc., Pittsburgh, PA (US)

(72) Inventors: Jonathan Taylor, Pittsburgh, PA (US); Sanjiv Singh, Pittsburgh, PA (US); Lyle Chamberlain, Pittsburgh, PA (US); Sebastian Scherer, Pittsburgh, PA (US); Benjamin Grocholsky, Oakland, CA (US); Vladimir Brajovic, Pittsburgh, PA (US)

(73) Assignee: Near Earth Autonomy, Inc., Pittsburgh, PA (US)

( * ) Notice: Subject to any disclaimer, the term of this patent is extended or adjusted under 35 U.S.C. 154(b) by 608 days.

(21) Appl. No.: 16/854,098

(22) Filed: Apr. 21, 2020

Related U.S. Application Data

(60) Provisional application No. 62/840,154, filed on Apr. 29, 2019.

(51) Int. Cl.
*G05D 1/06* (2006.01)
*B64C 39/02* (2023.01)
(Continued)

(52) U.S. Cl.
CPC ............ *G05D 1/0676* (2013.01); *B60L 53/10* (2019.02); *B64C 39/024* (2013.01); *B64D 27/24* (2013.01);
(Continued)

(58) Field of Classification Search
CPC ..... G05D 1/0676; B60L 53/10; B64C 39/024; B64C 2201/127; B64C 2201/145; B64C 2201/18; B64D 27/24; B64D 45/08; B64F 1/005; B64F 1/222; B64F 1/362; H04N 5/33

See application file for complete search history.

(56) References Cited

U.S. PATENT DOCUMENTS 8,868,256 B2 * 10/2014 Waid ...................... G05D 1/104
340/961
10,029,804 B1   7/2018 Chamberlain et al.
(Continued)

FOREIGN PATENT DOCUMENTS

WO      WO-2017173311 A1 * 10/2017 ............. A47G 29/14

*Primary Examiner* — Shardul D Patel
*Assistant Examiner* — Christine Nguyen Huynh
(74) *Attorney, Agent, or Firm* — K&L Gates LLP

(57) ABSTRACT

Systems, apparatuses, and methods for autonomously estimating the position and orientation ("pose") of an aircraft relative to a target site are disclosed herein, including a system including a plurality of beacons arranged about the target site, wherein the plurality of beacons collectively comprise at least one electromagnetic radiation source and at least one beacon ranging radio, a sensor system coupled to the aircraft including an electromagnetic radiation sensor and a ranging radio configured to determine a range of the aircraft relative to the target site, and a processor configured to determine an estimated pose of the aircraft based on at least: (i) detected electromagnetic radiation, and (ii) time-stamped range data for the aircraft relative to the target site.

14 Claims, 5 Drawing Sheets

(51) Int. Cl.
*B64D 45/08* (2006.01)
*H04N 5/33* (2023.01)
*B64D 27/24* (2006.01)
*B64U 70/00* (2023.01)
*B60L 53/10* (2019.01)
*B64F 1/00* (2006.01)
*B64F 1/22* (2006.01)
*B64F 1/36* (2017.01)
*B64U 101/30* (2023.01)

(52) U.S. Cl.
CPC .............. *B64D 45/08* (2013.01); *B64F 1/005* (2013.01); *B64F 1/222* (2013.01); *B64F 1/362* (2013.01); *H04N 5/33* (2013.01); *B64U 70/00* (2023.01); *B64U 2101/30* (2023.01); *B64U 2201/104* (2023.01)

(56) References Cited

U.S. PATENT DOCUMENTS

| | | |
|---|---|---|
| 10,151,588 B1 | 12/2018 | Singh et al. |
| 10,215,571 B2 | 2/2019 | Ghadiok et al. |
| 10,295,365 B2 | 5/2019 | Scherer et al. |
| 2016/0039542 A1* | 2/2016 | Wang .................. B64C 39/024 244/114 R |
| 2016/0335901 A1 | 11/2016 | Singh et al. |
| 2017/0045894 A1* | 2/2017 | Canoy .................. G08G 5/0013 |
| 2018/0357910 A1* | 12/2018 | Hobbs ..................... B64C 27/00 |
| 2019/0025858 A1* | 1/2019 | Bar-Nahum ......... G08G 5/0069 |
| 2020/0005656 A1 | 1/2020 | Saunamaeki |
| 2020/0012296 A1 | 1/2020 | Gurdan et al. |

\* cited by examiner

MULTIMODAL BEACON BASED PRECISION LANDING SYSTEM FOR AUTONOMOUS AIRCRAFT

PRIORITY CLAIM

The present application claims priority to U.S. provisional patent application Ser. No. 62/840,154, filed Apr. 29, 2019, having the same title and inventors are stated above, and which is incorporated herein by reference in its entirety.

BACKGROUND

Landing an aircraft at a designated point with significant precision is a challenging procedure requiring continuous coordinated guidance, navigation, and control. Furthermore, when visual conditions are degraded (e.g., illumination, precipitation, etc.), or the landing point is itself dynamic (e.g. ship decks, truck beds, etc.), the situation is markedly more complicated and higher risk. In order to ensure safety and reliability over an increased range of operating conditions, systems which can either augment the pilot controlled landing or completely automate the process of precision landing are needed. Such systems can be used in existing and future small or large-scale autonomous unmanned aerial vehicles (UAVs).

SUMMARY

While existing auto-landing systems typically rely exclusively on satellite navigation, i.e. the global positioning system (GPS) or local precision approach radar (PAR), the present invention in certain embodiments provides novel autonomous landing techniques incorporating multiple complementary sensing modes and beacon infrastructure to provide very high precision, low latency navigation as well as robust performance, safety, and integrity through multimodal redundancy. In one general aspect, the present invention is directed to a computerized, onboard perception sensor suite and avionics flight system for a piloted or autonomous aircraft (e.g., fixed-wing or vertical take-off and landing (VTOL) rotorcraft, vertically landing aircraft, etc.). The flight system guides the aircraft precisely to a specific landing site indicated by one or a plurality of multimodal navigational beacons and possibly other landing zone indicators, e.g. visual patterns. The system comprises the plurality of beacons. The plurality of beacons are spaced apart in three dimensions, preferably asymmetrically, at the landing site. Each of the beacons may comprise a light energy source, a ranging radio (e.g. ultra-wideband (UWB) or similar), a global positioning system (GPS) unit, inertial measurement unit (IMU), embedded processing, and may also include wired or wireless mesh network to communicate among the plurality of beacons as well as wireless communication between the beacons and aircraft. The aircraft comprises an onboard sensor suite and an onboard processor connected to the sensor suite. The onboard sensor suite may comprise one or more cameras, one or more ranging radios, and a GPS unit. The cameras are used for detecting the emitted light energy sources of the plurality of beacons and for recognizing other visual patterns at the landing site.

The one or more ranging radios of the aircraft sensor suite are for communicating with each of the plurality of beacons for determining continuously updated range distances from the aircraft to each of the plurality of beacons based on time-of-flight radio transmissions between the aircraft and each of the plurality of beacons. The multiple ranging radios on the aircraft may optionally be used to determine the relative angle-of-arrival (AoA) to the plurality of beacons using for instance phase difference techniques. The GPS unit is used for identifying the relative aircraft position to the plurality of beacons using differential GPS (DGPS) or real time kinematic (RTK GPS) approaches. The onboard sensor suite may also comprise a light detection and ranging (LIDAR) scanner and inertial measurement unit (IMU), and other relevant sensors. The onboard processor is programmed to store a map of the configuration of the plurality of beacons. Also, the onboard processor can store other landing indicators, which are either manually defined or automatically determined using a simultaneous localization and mapping (SLAM) technique using onboard sensor measurements and ranges between the plurality of beacons (if available). The position and orientation of the aircraft relative to the landing site is estimated by the system at a high rate as the aircraft approaches the landing site based on (i) the stored map configuration, (ii) the measured sensor data such as continuously updated range distances and heading data; (iii) a navigation filter performing sensor fusion.

Embodiments of the present invention can provide robust tracking of the aircraft due to its redundant systems. Even if one system fails, the position of the aircraft can still be tracked. Also, the overall system provides precise localization of the aircraft that is normally unobtainable with GPS alone. Further, the onboard sensor suite can be lightweight so that it is suitable for small drones, for example. These and other benefits of the present invention will be apparent from the description that follows.

BRIEF DESCRIPTION OF THE FIGURES

Various embodiments of the present invention are described herein by way of example in conjunction with the following figures, wherein.

DETAILED DESCRIPTION

In one general aspect, the present invention is directed to a beacon-based multimodal guidance and navigation system for autonomous precision landing of an aircraft. In the description below, the landing aircraft is assumed to be an autonomous rotorcraft, such as a helicopter or multirotor drone, but the present invention is not limited as such. Aspects of the present invention can be applied to other autonomous aircrafts as well as non-autonomous (i.e., piloted) aircraft. The term aircraft includes, but is not limited to: rotorcraft, fixed-wing aircraft, drones (i.e., unmanned aerial vehicle), flying capsules, spacecraft, gliders, flying boats, and flying cars, including vertically landing aircraft. In non-autonomous aircraft, the navigation system of the present invention may be used for autonomous landing, assisting with piloted landing, or a combination of both, depending on the specific circumstances pertaining to landing the non-autonomous aircraft. As such, aspects of the present invention could be used as part of the aircraft's instrument landing system.

The term "landing site" is used herein to refer to a particular location in a larger, general "landing zone" where the aircraft is targeted to land. For example, the "landing zone" might be a general landing location, such as a field or the top of a moving ground vehicle, that might include one or more possible landing sites, which are locations in the landing zone that are suitable for landing the rotorcraft. Upon selection of a desired landing site, the present invention may be used so that the aircraft lands precisely at the desired landing site, such as within a specific threshold accuracy level (e.g., actual landing is accurate within less than 10 centimeters distance away from the desired landing site).

Figure 1:
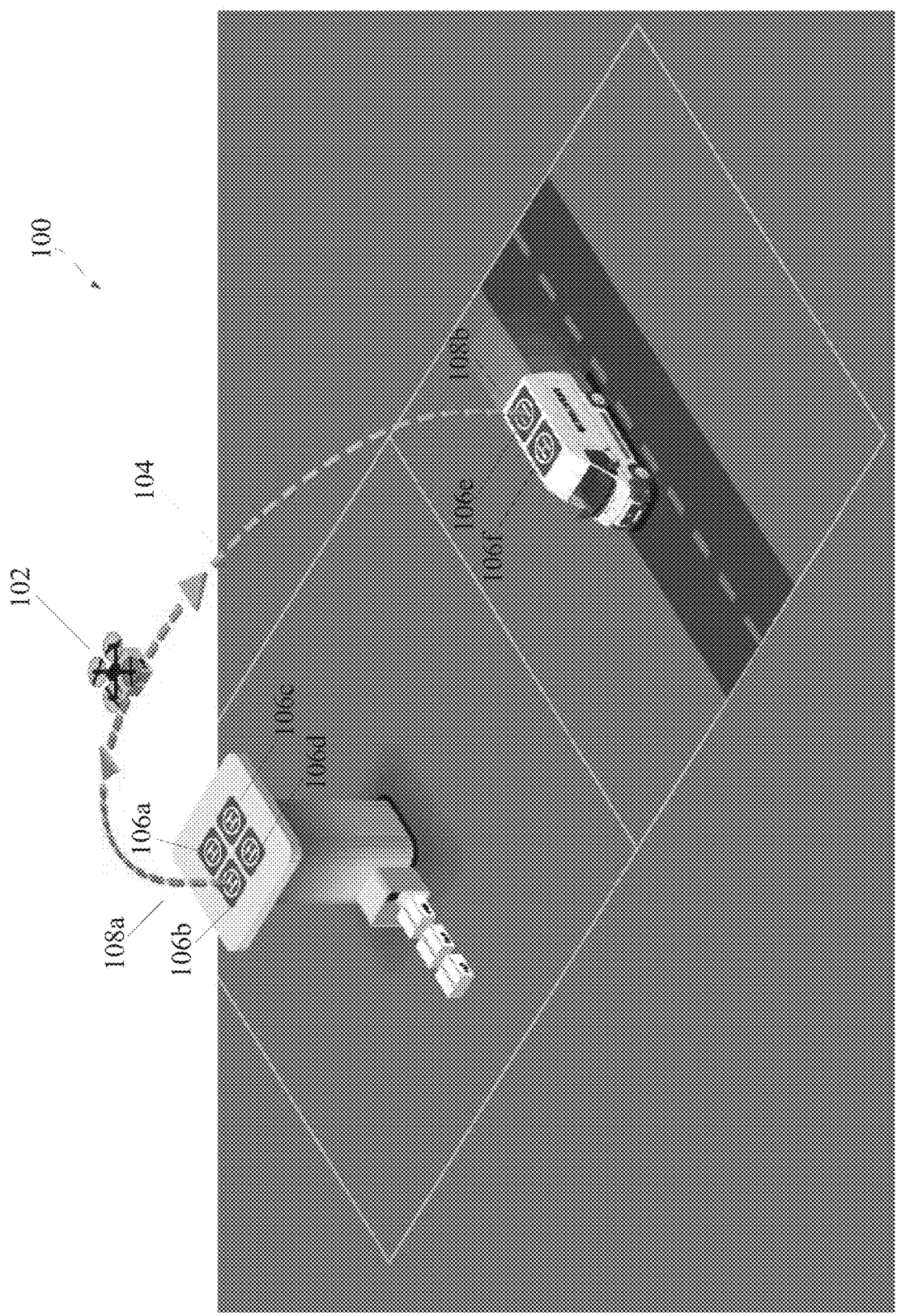
FIG. 1 is an illustration of precise possible trajectories of a vertically landing aircraft to multiple potential landing sites according to various embodiments of the present invention.

FIG. 1 is an illustration 100 of precise possible trajectories for an aircraft, in this case, a vertically landing aircraft 102, to multiple potential landing sites according to various embodiments of the present invention. As shown in FIG. 1, a vertically landing aircraft 102 is commencing the landing process towards either of potential landing zones 108a or 108b. Landing zones 108a, 108b depicted in illustration 100 are merely examples of types of possible, suitable landing zones for the aircraft 102; other types of possible landing zones that are not depicted in FIG. 1 could also be used, such as landing pads or spots on watercraft or truck beds. Landing zone 108a is a stationary landing pad whereas landing zone 108b is a moving vehicle. Although FIG. 1 depicts the aircraft 102 as having the option of landing at sites within either landing zone 108a, 108b, this is to illustrate the types of sites/zones for which the present invention may be potentially used and not to suggest that the guidance system needs two landing site/zone options for landing the aircraft.

The vertically landing aircraft 102 comprises a precision landing guidance (PLG) system (described with reference to FIG. 4) that constitutes, in various embodiments, a quadruple-redundant tracking system. As described in further detail herein, the quadruple-redundant tracking system comprises a beacon-based multimodal precise guidance and navigation system. Such a navigation system is referred to herein a quadruple-redundant or multimodal system because it comprises, in various embodiments, four sensing or processing modalities, including, but not limited to: (i) ranging radios, (ii) optical beacons, (iii) real-time kinematic (RTK GPS), and (iv) visual pattern detection. By using four modes, the navigation system more effectively provides indications of instantaneous position and attitude states of the aircraft 102 and advantageously may provide this position even when up to three of the sensing modes fail (e.g., experience malfunctions or otherwise cannot operate due to external conditions, such as low visibility). In this way, the aircraft 102 is able to land at the landing site with great precision, such as within 10 centimeters or within some other appropriate accuracy threshold relative to the desired landing spot and the aircraft's capabilities.

Figure 4:
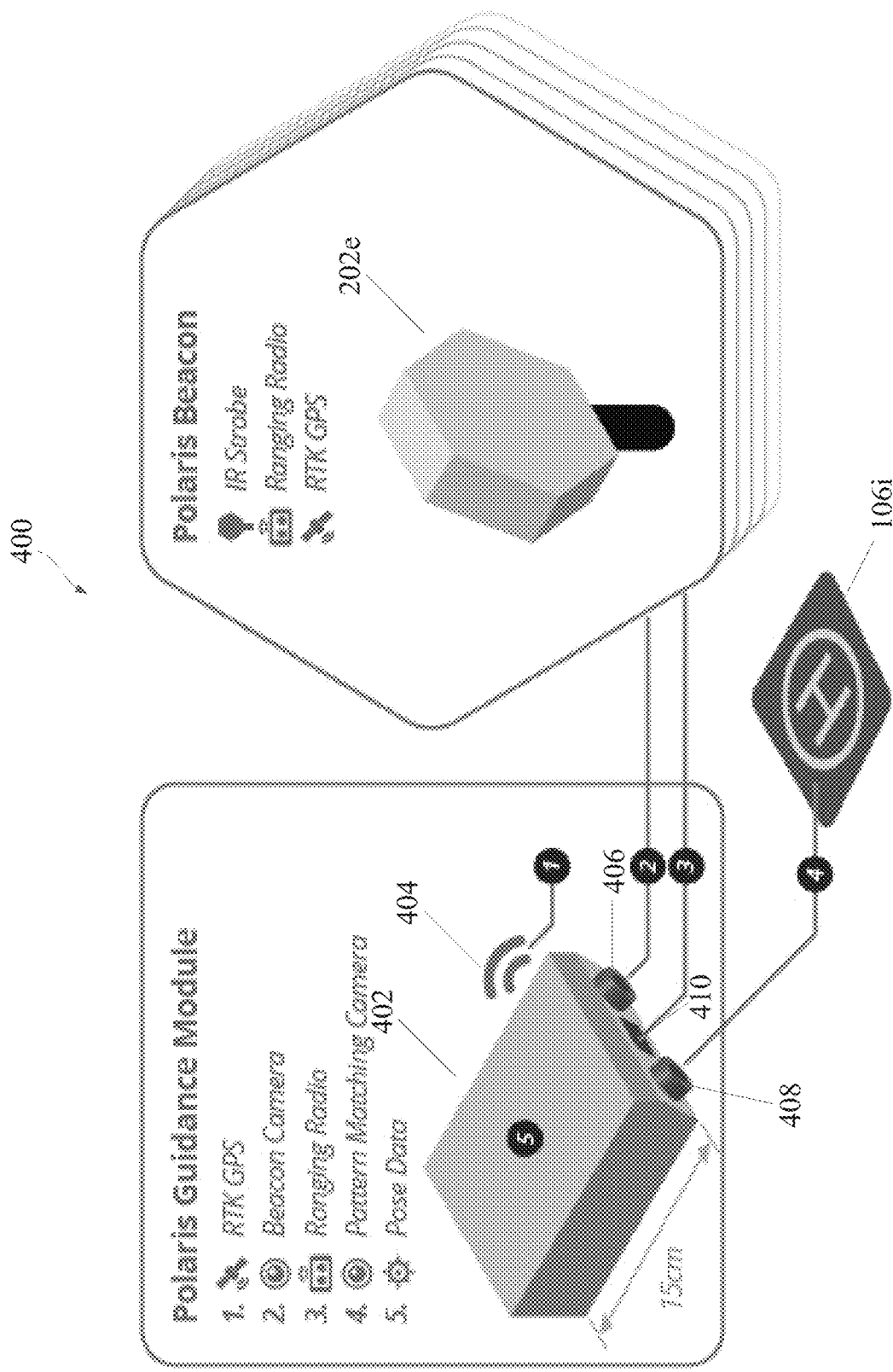
FIG. 4 depicts a view of an onboard sensor suite of a vertically landing aircraft and one of the beacons to indicate a landing site according to various embodiments of the present invention.
Figure 5:
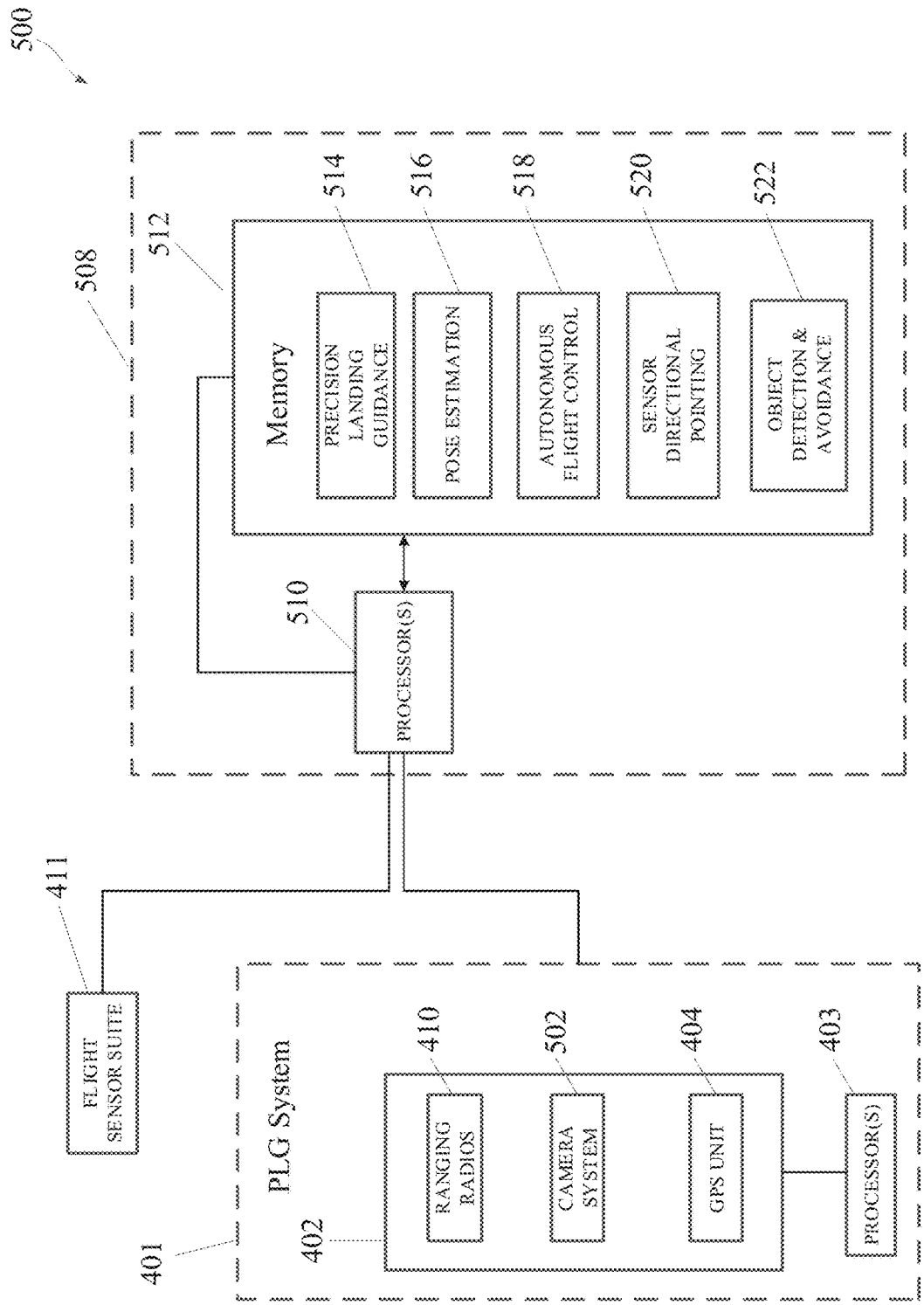
FIG. 5 is a block diagram of computerized, onboard flight system of a vertically landing aircraft according to various embodiments of the present invention.

The left-hand portion of FIG. 4 illustrates the sensor suite of the PLG system and the right-hand portion illustrates one of the landing site beacons according to various embodiments of the present invention. With reference to FIG. 5, the PLG system 401 may comprise, in various embodiments, a PLG sensor suite 402 and one or more processors 403. In various embodiments, the PLG system 401 may integrate with existing navigation systems of the aircraft 102. That is, in various embodiments, the PLG system may be an add-on system that is integrated with the existing navigation system of the aircraft 102 to provide the precision landing capabilities described herein.

The PLG sensor suite may comprise a camera system 502 that comprises two cameras, one or more ranging radios 410, and a RTK GPS unit 404 to implement the four sensing modalities. The processor(s) 403 controls and communicates with the sensors of the PLG sensor suite 402 and interfaces with the processor(s) 510 of the aircraft navigation system. As shown in FIG. 5, the aircraft 102 may comprise a normal flight navigation system for controlling the aircraft's flight other than when the PLG system 401 is activated. The aircraft's normal flight navigation system and the PLG system 401 may coordinate to land the aircraft precisely when the PLG system is activated. The normal flight navigation onboard sensor suite 411 may comprise any number of sensors necessary to navigate the aircraft 102 during normal flight operation, such as LIDAR sensors, an IMU, additional camera systems, radio, etc. The LIDAR sensors uses lasers (coherent light) or light waves generally to obtain LIDAR sensor data that can be used to recognize the shape of objects, for example. The IMU measures linear and angular motion with a plurality of gyroscopes and/or accelerometers. The normal flight navigation system may also comprise a processor(s) 510 for controlling the flight operation (e.g., autonomous flight control) based on data from the sensor suites 411, 402.

The two cameras of the PLG sensor suite 402 may be dual cameras in which one captures image data to track the location of the landing site beacons while the other captures image data for performing pattern detection/matching. The ranging radio(s) use radio waves to obtain range data for the aircraft 102, such as range data for the aircraft 102 relative to the beacons. The ranging radios may be UWB (e.g., relative bandwidths larger than 20% or absolute bandwidths exceeding 500 megahertz (MHz)) because a larger bandwidth generally improves reliability and accuracy. Large bandwidths enable high-resolution radio with high-ranging accuracy since a high number of different frequency components of the radio signal can be added to reduce the likelihood of signal collision with radio signal obstacles and other signal interference. Other suitable large bandwidth-ranging radios besides UWB can also be used. The RTK GPS unit may provide positional coordinates, such as latitude and longitudinal coordinates of the aircraft 102, for example, using satellite carrier-based ranging rather than code-based positioning. The positional coordinates of the RTK GPS can be accurate up to 1 centimeter level positioning in real time. The combination of the two cameras, ranging radios, and RTK GPS represent quadruple redundancy for PLG because the four sensing modes all perform tracking functionality (and can operate in parallel) and the sensing modes could independently guide the aircraft 102 to land. However, by using multiple sensing modes, the aircraft's guidance system advantageously addresses the different failure points of the various sensing modes, resulting in a more robust navigation system with improved precision. The aircraft's multimodal navigation system beneficially enables landing at a landing site demarcated by beacons with great precision.

At a minimum, i.e., with no redundancy, the PLG system 401 may operate and precisely land with merely a camera of the PLG sensor suite 402. That is, the camera may be sufficient to precisely land the aircraft as described herein. Preferably, however, the PLG system 401 uses more than the camera because, as discussed above, the additional sensor modalities incorporated into one sensor suite 402 enable improved landing precision and insulate against potential failures of one or more of the sensing modes. For example, the functionality of the camera can be impaired or fail due to weather conditions, such as high levels of dust, haze, or other visual obstructions. Additionally, the functionality of the ranging radios can be impaired or fail due to interfering signals (e.g., jamming signals) or other noise obstructing the radio receiver, while GPS can fail or be otherwise impaired, due to structures blocking the view to satellites or otherwise impaired communications, for example. Thus, the use of multiple sensing modes may beneficially address these different points of failure. As such, the multimodal navigation system of the aircraft 102 also improves aviation safety.

As shown in FIG. 1, when the aircraft 102 commences the landing process towards potential landing zones 108a, 108b, its PLG sensor suite may apply four modalities in conjunction to select a specific landing site, e.g., landing sites 106a-106d at landing zone 108a or landing sites 106e-106f at landing zone 108b for landing with great precision. The depiction of landing zones 108a, 108b and landing site 106a-106f are merely examples and are not intended to limit the locations where the aircraft 102 may land. Landing sites 106a-106f may be demarcated by beacons (not shown in FIG. 1) or characterized by certain detectable visual patterns (e.g., a circle drawn within the landing site). Landing zones and sites can be static or moving locations. As mentioned above, landing sites 106a-106d of landing zone 108a are static, non-moving locations on the top of a tower. Conversely, landing sites 106e-106f may be dynamic, moving locations on top of a moving van as depicted in FIG. 1. Other types of moving landing locations could also be used, such as landing platforms on watercraft or other vehicles. It should also be noted that if the vehicle is parked (e.g., the van in FIG. 1), the landing site is non-moving. As the aircraft 102 approaches the desired landing zone, it may activate the multimodal navigation system to begin the landing process.

The desired landing site may be provided to the aircraft 102 at the start of the mission/flight, or it could be transmitted wirelessly to the aircraft 102, such as from a command station, while the aircraft 102 is in flight. In various embodiments, the guidance system is activated when it is within a certain distance of the desired landing zone, such as 50 meters. The aircraft also stores, in onboard memory, a map of the landing zone. Again, the landing zone map may be stored in the aircraft's computer memory prior to the start of the flight/mission, or the landing zone map may be transmitted wirelessly to the aircraft, such as from a command station or a landing zone communication system, while the aircraft 102 is in flight. Alternatively, the landing zone map can be generated during flight through an onboard mapping procedure. The landing zone map may specify the position/configuration of the beacons and the location of the landing site relative to the beacon configuration. Prior to activation of the guidance system, the aircraft 102 may be navigated with its normal flight guidance/navigation system. When the multimodal navigation system is activated, the onboard processor of the aircraft 102 continuously receives updated sensor data from aircraft's onboard PLG sensor suite 402 so that the onboard processor(s) 403/510 can continuously update an estimated position of the aircraft relative to the landing site as the aircraft 102 approaches the landing site (e.g., along continuously determined trajectory 104).

In one embodiment, the aircraft 102 first uses the camera system 502 of the PLG sensor suite 402 to find the beacons at the landing site (based on their light energy emissions) in order to, with the stored beacon map, initialize the orientation/heading of the aircraft relative to the beacons. For this reason, the beacons may be asymmetrically configured in two or three dimensions. Subsequently, the aircraft 102 may use the ranging radio(s) 410 to transmit radio waves with one or more, and preferably all, of the landing site beacons to determine a range of the aircraft 102 relative to the beacons. This range data, along with the heading data from the camera, can be used to continuously update the position and orientation ("pose") of the aircraft. In this connection, the ultrawide bandwidth used by the ranging radios 410 can improve accuracy and reliability of determining the aircraft's instantaneous distance from the selected landing site. The onboard processor(s) 403/510 may use range data from the ranging radios to execute a suitable multi-lateration algorithm to determine the instantaneous location of the aircraft 102 and/or stationary points in space using multiple ranges. That is, multiple ranges to known locations, such as various beacons at the landing site, can be used to derive pose. Tracking pose with range data from the ranging radios may be effective even in degraded visual conditions, such as hazy, dusty, and low light (e.g. nighttime, shade) conditions. The camera system 502 and ranging radio(s) 410 may work in parallel so that the navigation system includes two sensing modes. The third sensing mode can be the RTK GPS unit 404, which enables the processor 403/510 to use trilateration for RTK GPS positional coordinates from three satellites, for example. The fourth sensing model may be visual pattern matching.

Figure 2:
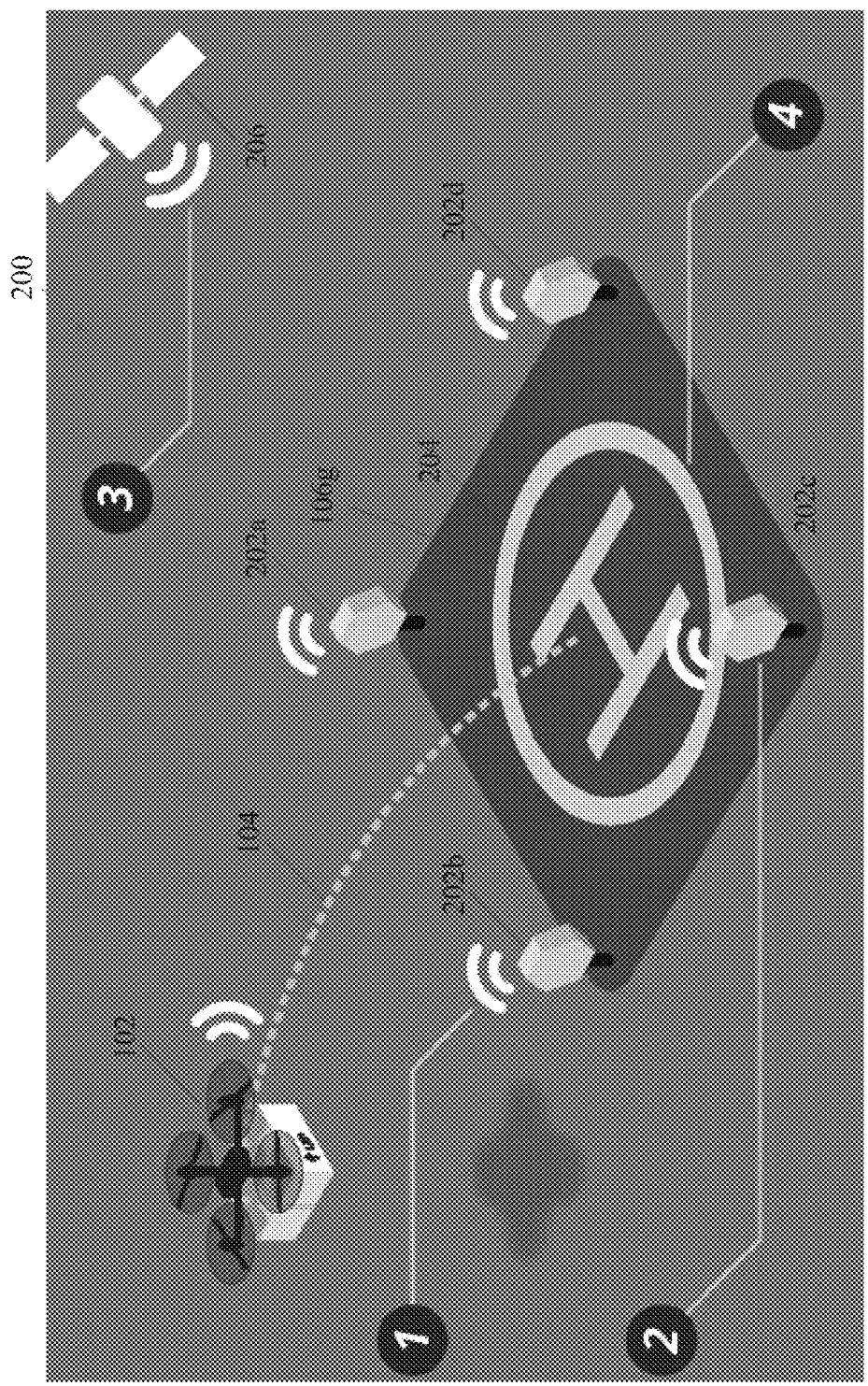
FIG. 2 is a perspective view of an exemplary precise landing by a vertically landing aircraft to a landing site demarcated by a plurality of beacons according to various embodiments of the present invention.

FIG. 2 is a perspective view 200 of an exemplary precise landing by the vertically landing aircraft 102 to a landing site 106g demarcated by a plurality of beacons 202a-202d according to various embodiments of the present invention. In the view 200, various embodiments of the four parallel sensing modalities of the closed-loop navigation system of the vertically landing aircraft 102 are illustrated. In FIG. 2, the selected landing site 106g is marked by a plurality of beacons 202a-202d (which are shown in FIG. 2 in a symmetric pattern for simplicity). The four beacons 202a-202d could be optical beacons that may be tracked by light (e.g., LED) or vision generally. That is, the aircraft's camera system 502 may detect light energy emitted from light energy sources of the plurality of beacons 202a-202d to identify the beacons 202a-202d in images captured by the onboard camera system. The light energy may be near infrared (NIR) light energy (and may be strobed), which advantageously could be more covert and incur less signal interference than other types of light energy. As a result, it could be less likely to mistake "natural sources" for beacons 202a-202d. Also, as described above, the aircraft's onboard processor(s) 403/510 may track the instantaneous distance between the aircraft 102 and the landing site 106g based on the range data, from the UWB radios, for each of the beacons. The UWB radios use time-of-flight data to determine range. In that connection, it may be important to very accurately assess the time of transmission and the time of receipt so that the instantaneous relative distance can be determined correctly and very precisely.

The aircraft's ranging radio(s) 410 may interrogate the beacons sequentially to determine the range to each beacon. In other embodiments, the beacons and the aircraft may employ a channel access method, such as time-division multiplexing and/or frequency-division multiplexing, so that the aircraft's ranging radio(s) 410 could communicate with and interrogate some or all of the beacons 202a-202d simultaneously. The ranging radios may have 360-degree antennas, and the aircraft 102 may obtain range/distance from each beacon by identifying each beacon and timing the radio signals transmitted by the ranging radios. The ranging radios may engage in two-way communication with the beacons so the corresponding range of each beacon is determined, either simultaneously or by cycling through the beacons.

As to sensing the beacons with the onboard camera system 502, in various embodiments, the beacons may be active in that they emit optical signals (e.g., light energy) on their own (e.g., are individually powered). In other embodiments, the beacons could be passive by functioning as passive reflectors of light, which could derive from transmissions from the aircraft. In a very basic implementation, the beacons 202a-202d could be similar to passive lightbulbs that merely turn off or on to act as a passive visual indicator of the landing site 106g. Preferably, however, the beacons 202a-202d are active beacons arranged in a pattern that may be detected by the onboard sensor suite 402 and processor(s) 403/510 of the aircraft 102. As mentioned above, the beacons 202a-202d may be arranged in an asymmetric pattern (in two dimensions or three dimensions) about a landing site (e.g., landing site 204, landing site 106g, or a landing zone 108a-108b), which can assist the PLG sensor suite 402 and processor(s) 403/510 with heading initialization using a visual sensing modality. In other words, the PLG sensor suite 402 and processor(s) 403/510 can more efficiently and effectively resolve flip ambiguity to accurately determine the correct current orientation/heading of the aircraft 102 if the beacons are asymmetrically configured.

As discussed above, the light energy detection camera, ranging radio, and RTK GPS of the PLG sensor suite 402, along with optionally sensor data from the sensors of the normal flight sensor suite 411, are redundant sensing modalities that when operating in parallel (e.g., data fusion, Kalman filtering) constitute a robust navigation system of the aircraft 102 that may track the beacons 202a-202d so that the aircraft may land safely at the landing site 106g indicated by the beacons with high precision while addressing different potential points of failure of the sensor suite.

From the three-dimensional position of the beacons 202a-202d, the PLG system 402 can continually determine the pose of the aircraft 102 relative to the landing site 106g. In addition, in embodiments where the beacons 202a-202d are arranged in a known formation, a map configuration representing this known formation can be stored in memory in the aircraft 102. Stated differently, the beacons 202a-202d could be installed in a particular location with calibrated position indicated in the stored map file received by the aircraft 102. Also, the map representing the beacon formation could be transmitted to the aircraft 102 during flight. In other embodiments, the three-dimensional position of the beacons 202a-202d could be solved by the onboard processor(s) 403/510 in an ad hoc basis, in which the onboard PLG sensor suite 402 and processor(s) 403/510 cycle through each beacon to determine localization as the aircraft 102 is approaching the landing site 106g. Thus, the three-dimensional location of the beacons 202a-202d could be determined remotely and sent to the aircraft 102 or determined by the processor(s) 403/510 and PLG sensor suite 402 operating in parallel. In any event, once the beacon configuration is known, it can be stored in the aircraft's computer memory, and the position and orientation of the aircraft relative to the landing site can be continuously updated as the aircraft approaches the landing site by comparing the pose data to the stored beacon configuration map.

Other suitable landing site markers/indicators besides beacons, such as augmented reality (AR) tags could be used. However, while AR tags are applicable for tracking based on image data, the AR tag should be kept within the center of a frame of the image data. Consequently, tracking based on AR tags requires that the aircraft 102 fly directly over the tag, and as such generally may not work as effectively for all aircraft types (e.g. fixed wing) or during degraded visual conditions. The beacons 202a-202d also may be arranged in a non-planar formation resulting in more accurate estimated relative aircraft states (e.g., relative position). Tracking and localizing the aircraft 102 relative to the beacons 202a-202d can be challenging because (i) the beacons 202a-202d appear uniform; (ii) the aircraft 102 is shaking, vibrating, and/or otherwise moving during flight; and (iii) locational/positional points should be tracked over multiple frames, such that a lock on tracking should be maintained over time. The multimodal beacon-based navigation system using multiple sensing modalities in parallel may address these challenges, as described herein.

As discussed above, arranging the beacons 202a-202d in an asymmetrical pattern, in two or three dimensions, may ease the difficulty of visually tracking the beacons 202a-202d with image data. The particular asymmetrical pattern selected for the formation of the beacons 202a-202d could be optimized based on several considerations, including the speed and trajectory of the aircraft 102, and any obstructions in the landing zone. The beacons 202a-202d might also form a mesh network. That is, the beacons may communicate with each other to resolve their spatial relationship, which may then be transmitted to the aircraft 102.

The radio signals from the ranging radio(s) 410 may constitute time-of-flight radio transmissions between the aircraft 102 and plurality of beacons 202a-202d. By obtaining multiple ranges from these radio transmissions, the ranging radio(s) 410 and processor(s) 403/510 may constantly calculate the range, and hence position, of the aircraft 102 relative to the plurality of beacons 202a-202d. As such, the range distance measurements are constantly updated as the ranging radios communicate with the different beacons. The UWB characteristic of the radios may enable each active beacon to operate at a different frequency band, which can increase reliability and accuracy of the radio transmissions/ranges. The ranging radios can be spaced apart so that their component antennas have different baselines relative to the beacons 202a-202d. The range data in combination with the initial bearing obtained from the image data by the camera system 502 can be used to resolve uncertainties regarding the changing pose of the aircraft 102. The RTK GPS tracking and visual pattern matching can be a third and fourth sensing mode built into the navigation system of the aircraft, in combination with the radio and beacon camera tracking. GPS positional coordinates may be obtained using satellite 206. Although FIG. 2 only depicts one satellite 206, more than one may be used and desired in order to perform multi-lateration, for example. To this end, three satellites 206 could be used for trilateration to provide a unique position signal.

The visual pattern detection camera of the aircraft's camera system 502 can provide a fourth sensing mode to detect and track distinctive patterns of the landing site 106g or landing zones 108a-108b. As shown in perspective view 200 in FIG. 2, as the aircraft 102 approaches the landing site 106g, the camera may obtain image data indicating specific patterns of the landing site 106g. The processor(s) 403/510 may determine that the indicated specific patterns include the circular shape denoting the boundaries of the landing site 106g, such as the "H" letter indicating the presence of a helicopter landing pad and other suitable visual markers, for example. The pattern-matching camera and onboard processor(s) 403/510 together may implement an object detection algorithm to determine objects and shapes. Accordingly, the object detection algorithm can be used to detect the distinctive patterns of visual markers to identify the landing site 106g, such as a distinctively shaped panel, tree, flag, or other suitable marker, for example. Moreover, the color of the marker as determined by the camera and processor could be used to identify visual markers. Furthermore, besides these four sensing modalities, the multimodal navigation system may rely on, for example, LIDAR scan data and/or IMU data from the flight sensor suite 411 of the aircraft 102. The LIDAR scanner can perform LIDAR sweeps to obtain multiple LIDAR point clouds, which the processor(s) 403/510 can use to determine the shape of objects or terrain features, for example. The IMU can be useful for estimating pose of the aircraft 102. Thus, with its navigation system, the aircraft 102 may localize its location relative to the beacons 202a-202d quickly and accurately to precisely land at the landing site with high accuracy. The present beacon-based navigation system may be applied for various different static and dynamic landing sites, such as a static or moving landing site of a deck of a ship or aircraft carrier, for example. The aircraft 102 may also be a drone carrying a package to deliver to a recipient at the landing site 106g, as illustrated by FIG. 2.

Figure 3:
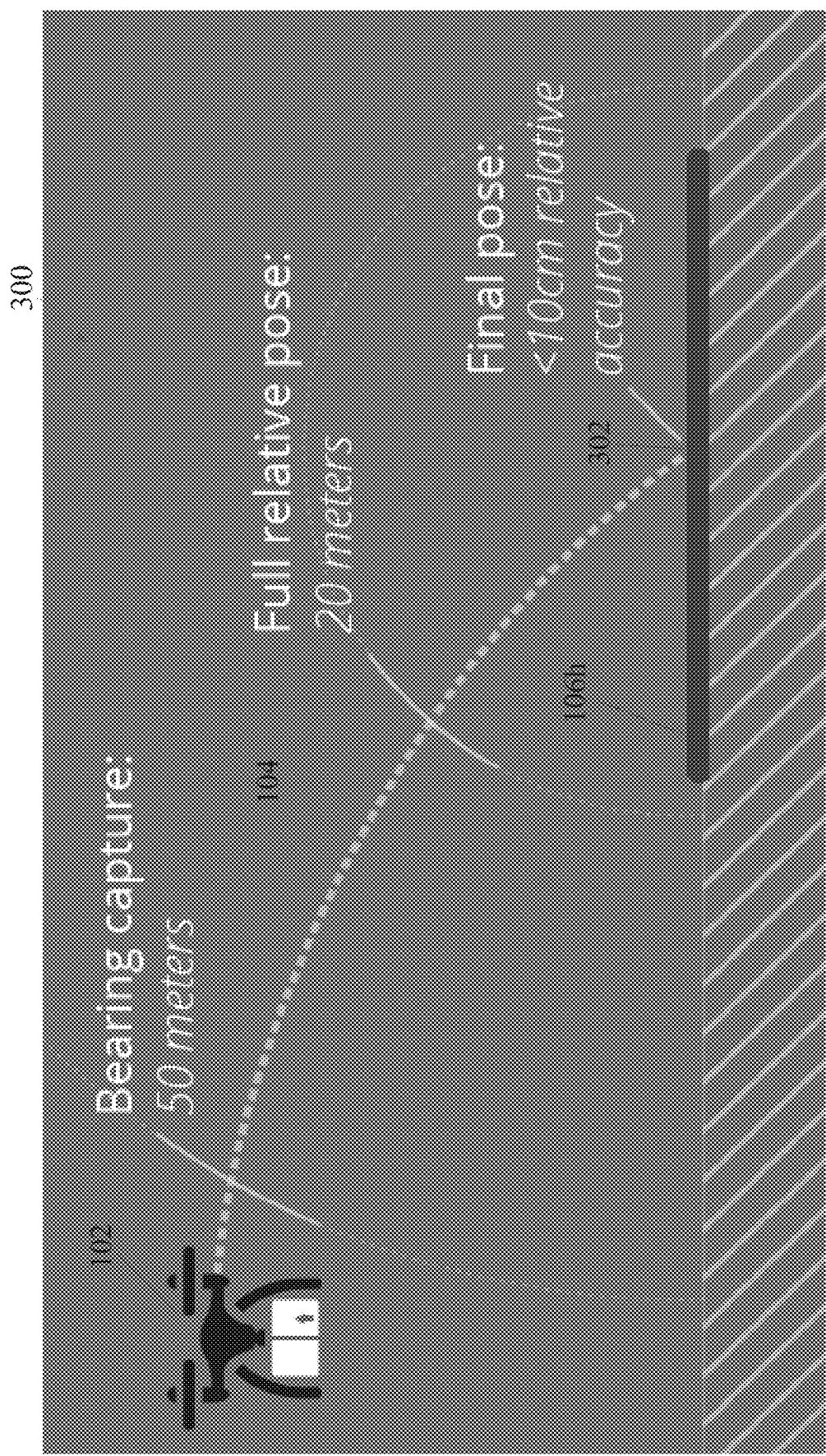
FIG. 3 is a side view of a particular trajectory of a vertically landing aircraft to land at a precise landing site with a threshold level of accuracy according to various embodiments of the present invention.

FIG. 3 is a side view 300 of a particular trajectory of the vertically landing aircraft 102 to land at a precise landing site 106h with a threshold level of accuracy according to various embodiments of the present invention. As shown in side view 300, the landing guidance functionality of the aircraft's multimodal navigation system may activate within some threshold distance, like 50 meters, from the selected landing site 106h. This landing guidance functionality can be considered akin to a closed-loop instrument landing system of the aircraft 102. This threshold distance may be sensed by the onboard sensor suite and communicated to the onboard processor. In various embodiments, the aircraft 102 may progress through determinations of bearing, pose, and/or location. As shown in FIG. 3, upon activation of the PLG system 401 at, for example, a range of 50 meters, the camera system 502 may perform initialization as described above in order to determine the current bearing of the aircraft 102. In various embodiments, the beacon camera yields image data that may be used by the processor(s) 403/510 to determine heading data for aircraft relative to the landing site 106h. Other sensing measurements from other sensing modalities of the PLG sensor suite 402 could be used to supplement or substitute for the camera system 502 during bearing initialization, depending on the circumstances. As the aircraft 102 flies toward the landing site 106h along trajectory 104, the UWB-ranging radios may continually communicate with the beacons 202a-202d (or other suitable landing site marker) with radio so that the radios and/or processor(s) 403/510 may determine range distances based on time of transmission and time of receipt. In particular, time-stamped radio measurements can be used to compute range. As discussed above, these radio measurements can be obtained by the ranging radios simultaneously or by cycling through the beacons 202a-202d, and each beacon can have its own frequency band within the UWB bandwidth. The beacons 202a-202d further may be tracked optically by the light energy (e.g., infrared light) emitted by the light sources of the beacons 202a-202d.

The combination of visual and radio tracking of the beacons 202a-202d may be sufficient by themselves to determine the full relative pose of the aircraft 102 relative to the beacons 202a-202d at some point along the trajectory 104, such as at 20 meters as illustrated in FIG. 3. The precision and robustness of the multimodal navigation system may be increased by further activating additional sensing modes in parallel to radio and vision tracking of the beacons 202a-202d. As discussed above, additional sensing modes include RTK GPS and visual pattern tracking. Also, LIDAR sensory data and IMU measurements can further supplement the four sensing modes. All of the sensing modes used in parallel by the multimodal navigation system may involve sensor fusion and application of Kalman filtering by the processor(s) 403/510. The Kalman filter may address the fact that there can be uncertainties involved in the various measurements obtained by the sensor suite; namely, there is uncertainty in the estimated/determined current position of the aircraft 102 and measurement uncertainty for each of the four (or other number) of sensing modes. This uncertainty at least partially derives from the fact that the aircraft 202 is constantly moving, and particularly, the aircraft 202 is moving towards the landing site 106h. The uncertainties can be augmented if the landing site 106h is moving, such as if the landing site 106h is on an aircraft carrier or other watercraft that is moving in up to six dimensions (x, y, z, roll, pitch, yaw axes) in water. To address this uncertainty, the Kalman filter may recursively use state space techniques and measurement updates so that the filter loops through a state prediction step and a measurement update step (involving the so-called Kalman gain). Stated differently, the Kalman filter comprises a dynamic model of the aircraft's current pose/relative position and measurement models for each sensing mode.

Although the PLG sensor suite 402 was described above as including the camera system, ranging radio(s), and GPS unit, one or more of these sensing modes may not be present in some embodiments of the PLG sensor suite 402 but with a corresponding reduction in redundancy. By executing suitable sensor fusion and Kalman filtering with the onboard processor(s) 403/510, the various sensing modes of the multimodal navigation system may be used in parallel to increase accuracy and decrease the risk of failure points occurring. As discussed above, the sensing modalities may have different failure points. The camera system may be impaired or fail when degraded visual conditions result from haze, dust, or wind, for example, or other obstructions, such as walls. Also, low light or visibility could generally impair the ability of the beacon camera to detect light energy emitted from the beacons 202a-202d. Moreover, radio transmissions from the ranging radios can attenuate, experience interference, and/or become jammed altogether. Similarly, the RTK GPS unit may fail when communication from the satellite(s) 206 is blocked, weakened from attempting to propagate through solid objects, or otherwise not functioning. In certain circumstances, trilateration of the RTK GPS data may be impaired. IMU measurements, for example, can suffer from drift error. When certain sensing modalities are reduced in effectiveness, the navigation system may proportionately rely on more effective sensing modalities of the sensor suite in applying sensor fusion. In this way, the multimodal navigation system is more robust, improves landing and navigation precision, and improves landing safety.

Accordingly, the aircraft 102 may determine or estimate with high accuracy its full pose relative to the beacons 202a-202d and/or landing site 106h. The aircraft 102 may continue along the trajectory 104, relying on the PLG sensor suite 402 and processor(s) 403/510 to continually update its pose. The beacons 202a-202d may initially be identified by the processor(s) 403/510 executing a beacon formation identification algorithm with camera image data. In this connection, the processor(s) 403/510 could use detection of the emitted NIR light of the beacons 202a-202d to determine the presence of the beacon formation for landing. Additionally or alternatively, the processor(s) 403/510 may compare the identified beacon formation to a known beacon configuration stored in a map file, which could be installed in the aircraft's memory before or during flight. Upon determining the identity of the beacon formation, the processor(s) 403/510 may perform real-time, continuous aircraft localization of the aircraft as it approaches and lands at the landing spot using one or more of (i) range data from the UWB radios, (ii) image data from the beacons, (iii) GPS position data, and (iv) visual pattern matching. In this way, the multimodal navigation system of the aircraft 102 enables the aircraft 102 to land at the landing spot 302 with great precision, such as within 10 centimeters of accuracy. This landing accuracy and precision is significantly better than non-high-precision landing techniques, such as those that land with a variance of around 20 to 30 meters, for example.

FIG. 4 depicts a view 400 of an PLG sensor suite 402 of the aircraft 102 and one of the beacons 202e to indicate a landing site 106i according to various embodiments of the present invention. The PLG sensor suite 402 may comprise, for example, the RTK GPS unit 404, the beacon camera 406, the pattern detection camera 408, and the ranging radio(s) 410. The RTK GPS unit 404 comprises a GPS receiver that can receive positional coordinates from satellite(s). The ranging radios 410 may be UWB radios with transceivers to perform two-way communication with the UWB radio of the beacon 202e. The beacon camera 406 and pattern detection camera 408 together may comprise the camera system of the sensor suite 402. As discussed above, the pattern detection camera 408 may gather image data for identifying distinctive visual patterns indicative of the landing site 106i while the beacon camera 406 may track the beacon 202e by detecting light energy emitted by the beacon's light-emitting source. As shown in FIG. 4, the beacon 202e may have a light energy, such as an infrared light source for transmitting an IR strobe detectable by the beacon camera 406. The beacon 202e may also comprises a GPS unit for communicating its GPS coordinates to the onboard sensor suite. This may be critical when the landing site is moving.

For an autonomous aircraft, the continuously updated aircraft pose data determined by the sensor suite and onboard processor may be used by an onboard flight controller of the aircraft 102. In one embodiment, the PLG sensor suite 402 could instead be a remote, off-board guidance module for the aircraft 102. For example, in military applications, a soldier could control the sensor suite 402 as a remote landing guidance module for the autonomous aircraft 102. Each of the beacons 202a-202e may comprise a light energy source, a ranging radio (e.g., ultra-wideband (UWB) or similar), a global positioning system (GPS) unit, inertial measurement unit (IMU), and embedded processing to determine their individual beacon state. Thus, based for example on a wireless link between the beacons 202a-202e and the aircraft 102, the beacons 202a-202e could communicate their respective beacon state (e.g, beacon position) to the PLG system 402. Moreover, as described above, the beacons 202a-202e may include a wired or wireless mesh network to communicate among themselves.

Now that embodiments of the multimodal beacon landing system of the aircraft 102 have been described, a description of exemplary navigation components of the aircraft 102 according to various embodiments is provided. FIG. 5 is a block diagram 500 of a computerized, onboard flight system of the aircraft 102 according to various embodiments of the present invention. As shown in the block diagram 500, the aircraft 102 has a computerized, onboard flight system comprising the normal flight sensor suite 411 and the PLG system 401, which comprises the PLG sensor suite 402 and the PLG sensor system processor(s) 403. The aircraft's navigation system also comprises a computer system 508, which comprises the processor(s) 510 and the computer memory 512, and which is in communication with the flight sensor suite 411 and the PLG system 402. The PLG sensor suite 402 comprises the ranging radios 410, camera system 502, and RTK GPS unit 404. As discussed above, the camera system 502 may comprise the beacon camera 406 and visual pattern detection camera 408. More than one of each sensory mode could be provided; for example, there could be more than one RTK GPS unit 404. The flight sensor suite 411 may comprise additional sensors such as a LIDAR system and an IMU, etc., as described herein. The computer system processor(s) 510 is communicatively coupled to memory 512 to form the computer system 508 of the aircraft 102. The processor 510 may be programmed to execute various software modules as illustrated in FIG. 5. In this connection, the computer system 508 may comprise a number of software modules, including a pose estimation module 516 for continuously updating the pose of the aircraft based on data from the sensor suite 411, 402; and autonomous flight control module 518 for controlling the flight path and trajectories of an autonomous aircraft 102; and a sensor directional pointing module 520 for controlling where, over time, the sensors of the flight sensor suite 411 are pointing (e.g., toward ground or straight ahead). Some embodiments may include sensors and processing enabling an object detection and avoidance module 522 for detecting objects in the flight path and determining flight trajectories to avoid them.

FIG. 5 also shows the PLG module 514, which is for precisely guiding the aircraft to the landing site as described herein. The software for the precision PLG module 514 may be shared and executed across both the processor(s) 403 and the processor(s) 510. The processor(s) 403, 510 may be programmed to execute the pose estimation module 516 to constantly update the pose (e.g., latitude, longitude, altitude, direction over time, bearing/heading) of the aircraft 102 relative to the landing site 106i and/or landing spot 302 by tracking the beacons 202a-202e using: (i) one or more of the continuously updated range distances with the ranging radios 410, (ii) detected light energy and visual tracking with the camera system 502, (iii) RTK GPS coordinates with the RTK GPS unit 404, and (iv) the stored map configuration of the beacons 202a-202e or the beacon formation determined on the fly by the processor(s) 510.

In the embodiments described above, the PLG system 401 was described as an add-on to be integrated with the existing flight control system of the aircraft. In other embodiments, the PLG system 401 does not need to be an add-on. The sensors for the PLG system could be incorporated in the flight sensor suite 411 for the aircraft 102, and the processor(s) 510 of the aircraft's flight navigation system may be programmed to precisely land the aircraft as described herein.

Furthermore, the plurality of beacons 202a-202d can verify the integrity of the solution computed by the processor(s) 510, by independently computing multiple solutions and comparing them to one another and to the solution computed by the processor(s) 510. Generally, the use of different modalities ensures the independence of certain types of failures such as radio-multipath. For example, the solutions computed by the plurality of beacons 202a-202d may differ from those computed by certified WAAS receivers, where multi-path can still corrupt the solution. Specifically, if more than three solutions are computed by the processor(s) 510 or the plurality of beacons 202a-202d, a voting scheme can be utilized to determine which solution to trust. Additionally, any beacon of the plurality of beacons 202a-202d can be configured to transmit a real-time kinematic correction signal, which can be received by the PLG sensor suite 402 and can be used to verify and/or correct the GPS signal generated by the GPS unit 404. Furthermore, the PLG sensor suite 402 can use frequency modulated continuous wave, pulse-modulated light, and/or precise timing via GPS to supplement positioning data received by the ranging radio 410.

The aircraft 102 may be a rotor or fixed-wing aircraft, such as a drone, unmanned aerial vehicle, etc. As such, the aircraft 102 may comprise steering and propulsion systems. For example, the steering/propulsion system for a rotorcraft (e.g., a drone or other type of rotorcraft) can comprise the rotorcraft's motor-powered rotor(s). The steering/propulsion system for a fixed-wing aircraft can comprise the engine(s) along with ailerons, elevators, rudders, spoilers, and/or air brakes for steering, for example. An autonomous aircraft can comprise a flight navigation system that computes flight trajectories for the aircraft and controls the aircraft's steering/propulsion system according to the computed flight trajectories. The autonomous flight control module 518 can use the continuously updated, real-time pose estimate of the aircraft 102 computed by the PLG system 401 when computing the flight trajectories for the aircraft 102.

The processors 403 and 510 may comprise one or more, preferably multi-core, processors. The memory 512 may comprise multiple memory units and store software or instructions that are executed by the processor(s), including the above-mentioned software modules. The memory units that store the software/instructions that are executed by the processor may comprise primary computer memory, such as random-access memory (RAM) or read-only memory (ROM). The software may also be stored in secondary computer memory, such as hard disk drives and solid-state drives. Also, the computer system 508 may comprise one or more computer devices, such as laptops, PCs, servers, etc. Where multiple computer devices are employed, they may be networked through wireless or wireless links, such as an Ethernet network. Each of the one or more computer devices of the computer system 508 comprises one or more processors and one or more memory units. The memory units may comprise software or instructions that are executed by the processor(s). The memory units that store the software/instructions that are executed by the processor may comprise primary computer memory, such as RAM or ROM. It may also be stored in secondary computer memory, such as diskettes, compact discs of both read-only and read/write varieties, optical disk drives, hard disk drives, solid-state drives, or any other suitable form of secondary storage.

The modules described herein may be implemented as software code stored in a memory unit(s) of the onboard computer system 508 that is executed by a processor(s) of the onboard computer system 508. In various embodiments, the modules and other computer functions described herein may be implemented in computer software using any suitable computer programming language, such as SQL, MySQL, HTML, C, C++, or Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C #, COBOL, Fortran, Java, Lisp, Pascal, Object Pascal, Haskell, and ML; and examples of scripting languages include Bourne script, JavaScript, Python, Ruby, Lua, PHP, and Perl.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for estimating the position and orientation ("pose") of an aircraft relative to a target site comprising a visible pattern marking as the aircraft approaches the target site, the system comprising:
 a plurality of beacons arranged asymmetrically about the target site, wherein the plurality of beacons collectively comprise multiple light sources and at least one beacon ranging radio configured to transmit and receive radio waves;
 a sensor system coupled to the aircraft, wherein the sensor system comprises:
  a camera system configured to:
   detect light from the multiple light sources of the plurality of beacons; and
   detect the visible pattern marking;
  a ranging radio configured to transmit and receive radio waves and generate range data for the aircraft relative to the target site, wherein the range data is based on radio waves received from the at least one beacon ranging radio; and
  a real-time kinematic ("RTK") GPS unit;
  such that the sensor system comprises at least four sensing modalities comprising (i) detection of the light from the multiple light sources, (ii) detection of the visible pattern marking, (iii) range data, and (iv) RTK GPS data; and
 a processor configured for signal communication with the sensor system, wherein the processor is configured to:

compute a pose of the aircraft for each of the at least four sensing modalities, during a flight by the aircraft, when data for the sensing modality are sensed by the sensor system; and continuously compute estimated poses of the aircraft relative to the target site as the aircraft approaches the target site by:

determining a number of the at least four sensing modalities that is effectively operative and upon a determination that only one of the at least four sensing modalities is effectively operative, computing a first estimated pose of the aircraft based on the only one of the at least four sensing modalities; and upon a determination that two or more of the at least four sensing modalities are effectively operative, computing a second estimated pose of the aircraft based on a fusion of data from each of the two or more of the at least four sensing modalities that are effectively operative.

2. The system of claim 1, wherein the processor is further configured to compute an initial bearing of the aircraft relative to the target site as the aircraft flies toward the target site before computing the estimated poses of the aircraft relative to the target site.

3. The system of claim 2, wherein the initial bearing is computed based on the light detected by the camera system.

4. The system of claim 1, wherein the processor is further configured to improve the computation of the estimated poses of the aircraft by:

computing additional estimated poses for the aircraft based on: (i) the light detected by the camera system; (ii) images of the visible pattern marking captured by the camera system; (iii) time-stamped range data for the aircraft relative to the target site; and (iv) RTK GPS positional coordinates for the aircraft; and employing a voting scheme to select one of the additional estimated poses as an improved pose of the aircraft.

5. The system of claim 4, wherein the plurality of beacons, collectively, is further configured to emit a real-time kinematic correction signal, and wherein the processor is further configured to:

receive the real-time kinematic correction signal from the plurality of beacons; and compute the estimated poses of the aircraft based on the real-time kinematic correction signal.

6. The system of claim 1, wherein at least one of the multiple light sources comprises a reflector of light incident on the reflector from a light source that is external to the plurality of beacons.

7. The system of claim 1, wherein the processor is further configured to compute the estimated pose of the aircraft relative to the target site via Kalman filtering.

8. The system of claim 1, wherein the plurality of beacons are arranged asymmetrically about the target site in three dimensions.

9. An aircraft configured to estimate a position and orientation ("pose") of the aircraft relative to a target site comprising a visible pattern marking as the aircraft approaches the target site, wherein a plurality of beacons are arranged about the target site, and wherein the plurality of beacons collectively comprise multiple light sources and at least one beacon ranging radio configured to transmit and receive radio waves, the aircraft comprising:

a propulsion system;

a flight navigation system in communication with the propulsion system;

a sensor system in communication with the flight navigation system, wherein the sensor system comprises:

a camera system configured to:

detect light from the multiple light sources of the plurality of beacons; and detect the visible pattern marking; and a ranging radio configured to transmit and receive radio waves and generate range data for the aircraft relative to the target site, wherein the range data is based on radio waves received from the beacon ranging radio; and a real-time kinematic ("RTK") GPS unit;

such that the sensor system comprises at least four sensing modalities comprising (i) detection of the light from the multiple light sources, (ii) detection of the visible pattern marking, (iii) range data, and (iv) RTK GPS data; and a processor configured for signal communication with the sensor system and flight navigation system, wherein the processor is configured to, continuously as the aircraft approaches the target site:

compute a pose of the aircraft for each of the at least four sensing modalities, during a flight by the aircraft, when data for the sensing modality are sensed by the sensor system;

determine which of the least four sensing modalities are effectively operative; and compute an estimated pose of the aircraft relative to the target site by:

upon a determination that two or more of the at least four sensing modalities are effectively operative, computing the estimated pose of the aircraft based on a fusion of data from each of the two or more of the at least four sensing modalities that are effectively operative; and upon a determination that a single sensing modality of the at least four sensing modalities is effectively operative, computing the estimated pose of the aircraft based on the single sensing modality.

10. The aircraft of claim 9, wherein the processor is further configured to compute an initial bearing of the aircraft relative to the target site as the aircraft flies toward the target site before computing the estimated pose of the aircraft relative to the target site, and wherein the initial bearing is computed based on the light detected by the multiple light sources.

11. A sensing apparatus configured to estimate the position and orientation ("pose") of an aircraft relative to a target site comprising a visible pattern marking as the aircraft approaches the target site, wherein a plurality of beacons are asymmetrically arranged about the target site, wherein a plurality of beacons are arranged about the target site, and wherein the plurality of beacons collectively comprise multiple light sources and at least one beacon ranging radio configured to transmit and receive radio waves, the sensing apparatus comprising:

a camera system configured to:

detect light from the multiple light sources of the plurality of beacons; and detect the visible pattern marking;

a ranging radio configured to transmit and receive radio waves and generate range data for the aircraft relative to the target site, wherein the range data is based on radio waves received from the at least one beacon ranging radio; and a real-time kinematic ("RTK") GPS unit;

such that the sensing apparatus comprises at least four sensing modalities comprising (i) detection of the light from the multiple light sources, (ii) detection of the visible pattern marking, (iii) range data, and (iv) RTK GPS data; and a processor configured for signal communication with the sensor apparatus, wherein the processor is configured to identify the target site and compute a pose of the aircraft for each of the at least four sensing modalities, during a flight by the aircraft, when data for the sensing modality are sensed by the sensor system, such that the processor can compute an estimated pose of the aircraft relative to the target site by:

determining that only one of the at least four sensing modalities is effectively operative and computing a first estimated pose of the aircraft based on the only one of the at least four sensing modalities; and determining that two or more of the at least four sensing modalities are effectively operative and computing a second estimated pose of the aircraft based on a fusion of data from each of the two or more of the at least four sensing modalities that are effectively operative.

12. The sensing apparatus of claim 11, wherein the processor is further configured to compute an initial bearing of the aircraft relative to the target site as the aircraft flies toward the target site before computing the pose of the aircraft relative to the target site, and wherein the initial bearing is computed based on the light detected by the multiple light sources.

13. A method of estimating the position and orientation ("pose") of an aircraft relative to a target site comprising a visible pattern marking as the aircraft approaches the target site, wherein a plurality of beacons is arranged in a pattern about the target site, wherein a plurality of beacons are asymmetrically arranged about the target site, and wherein the plurality of beacons collectively comprise multiple light sources and at least one beacon ranging radio configured to transmit and receive radio waves, the method comprising:

detecting, via a camera system of a sensor system of the aircraft, light from the multiple light sources of the plurality of beacons;

detecting, via the camera system of a sensor system of the aircraft, the visible pattern marking;

generating, via a ranging radio of the sensor system of the aircraft, range data for the aircraft relative to the target site, wherein the range data is based on radio waves received from the beacon ranging radio;

generating, via a real-time kinematic ("RTK") GPS unit of the sensor system of the aircraft, RTK GPS positional coordinates for the aircraft;

identifying, via a processor of the aircraft, the target site based on the light detected by the camera system and images of the visible pattern marking from the camera system, wherein the processor is configured to compute a pose of the aircraft for each of the at least four sensing modalities, during a flight by the aircraft, when data for the sensing modality are sensed by the sensor system; and;

determining, via the processor, at a first time instance, that only one of the at least four sensing modalities is effectively operative;

computing, via the processor, at the first time instance, the estimated pose of the aircraft relative to the target site based on the only one of the at least four sensing modalities;

determining, via the processor, at a second time instance, that two or more of the at least four sensing modalities are effectively operative; and computing, via the processor, at the second time instance, the estimated pose of the aircraft relative to the target site based on a fusion of data from each of the two or more of the at least four sensing modalities that are effectively operative.

14. The method of claim 13, further comprising computing an initial bearing of the aircraft relative to the target site based on the light detected by the multiple light sources, as the aircraft flies toward the target site before computing the estimated pose of the aircraft relative to the target site.

\* \* \* \* \*